No. 824,389. PATENTED JUNE 26, 1906.
O. L. STUMP.
FILTER FOR FEED WATER HEATERS.
APPLICATION FILED SEPT. 9, 1905.
4 SHEETS—SHEET 4.
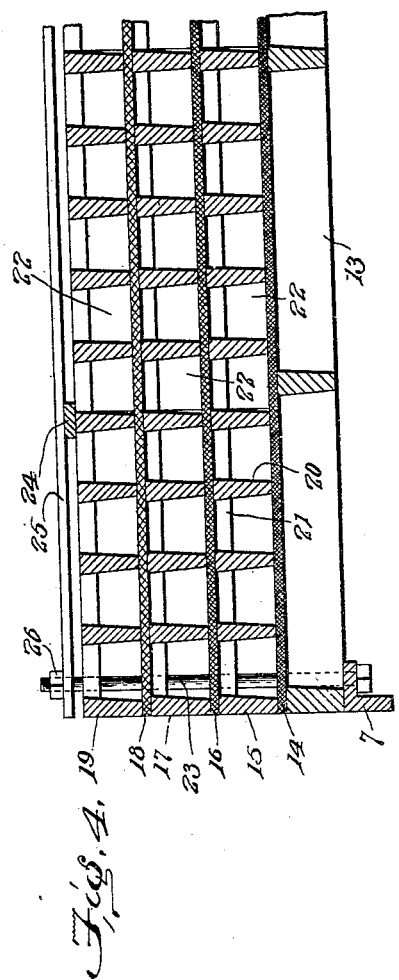
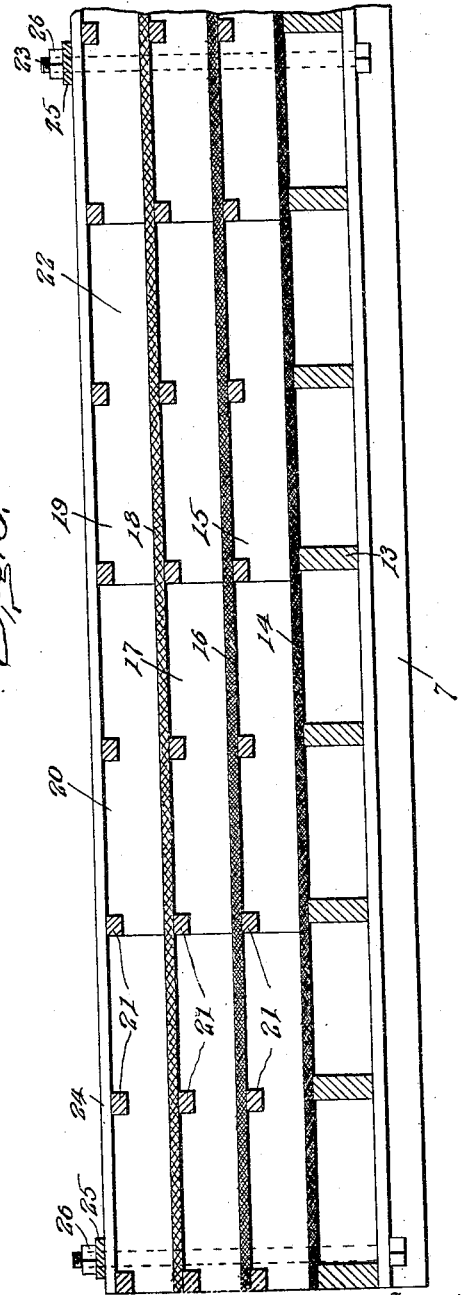
Witnesses
G. Howard Walmsley,
Irvine Miller.
Inventor
Oman L. Stump,
By H. A. Toulmin.
Attorney

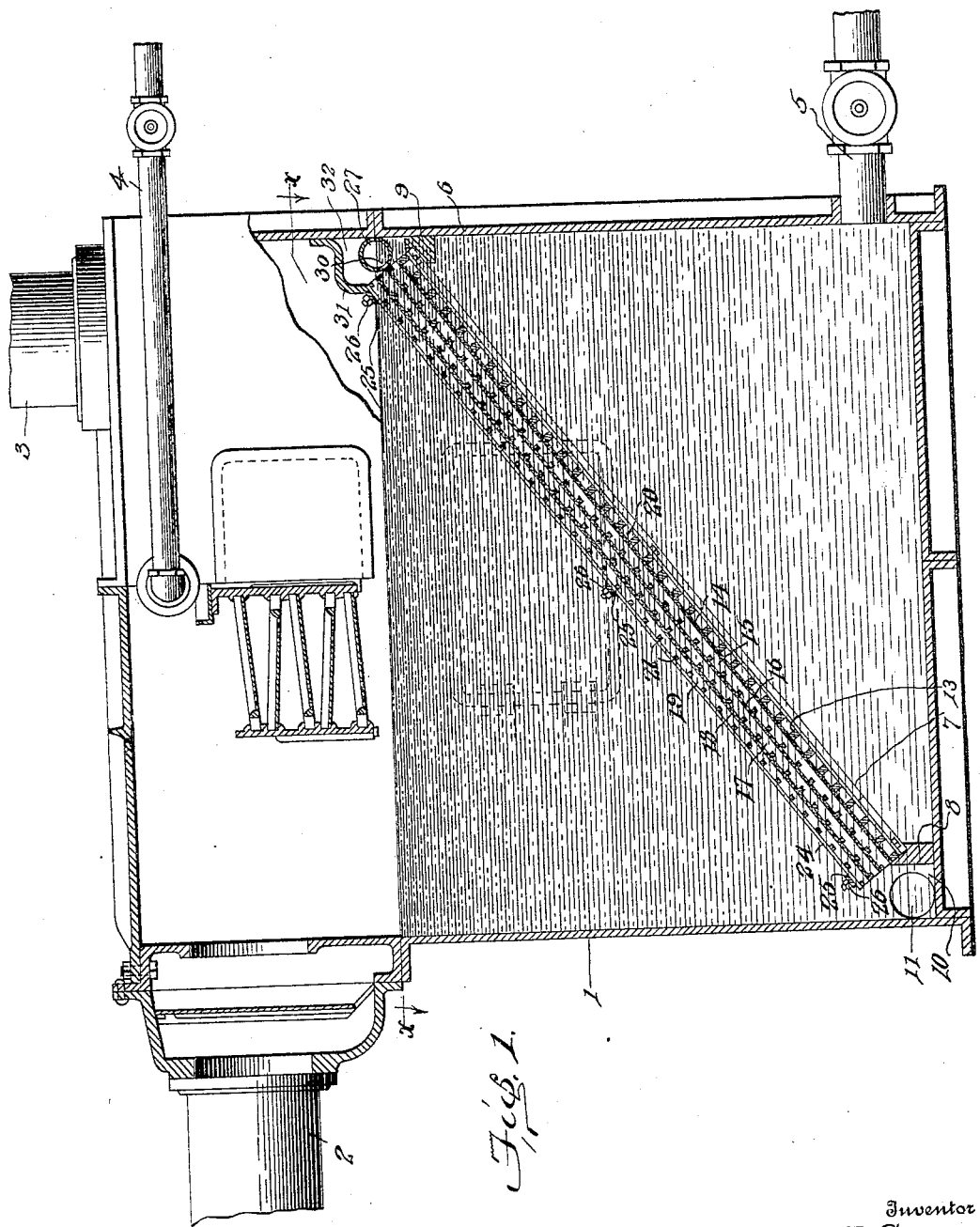

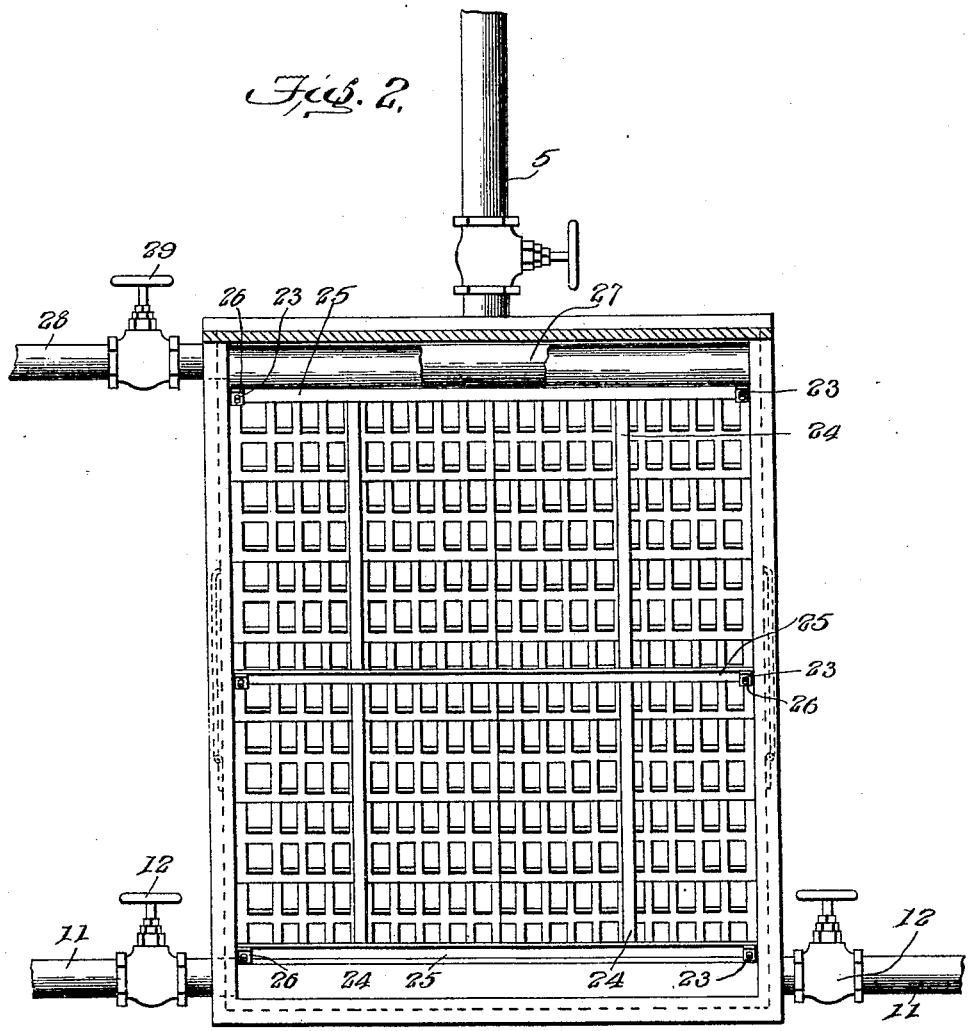

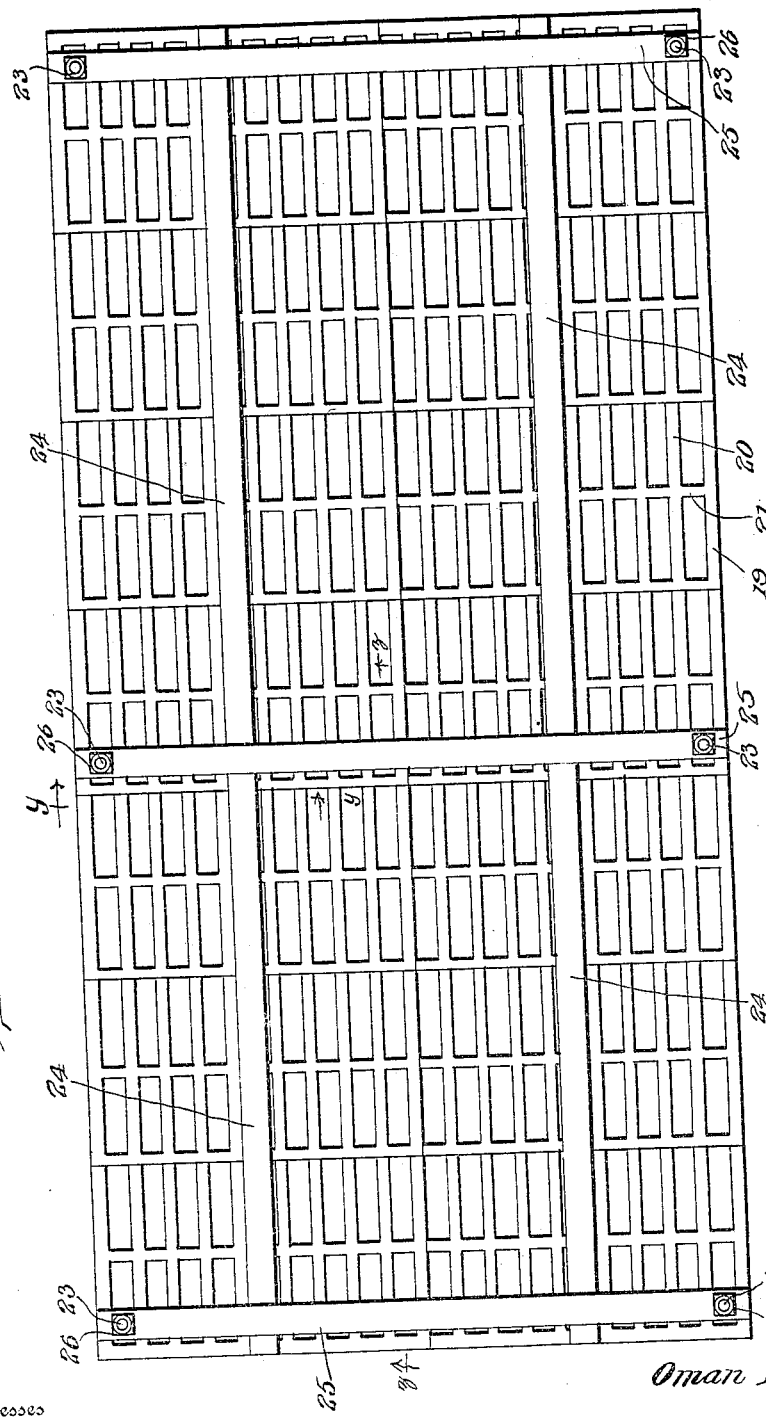

UNITED STATES PATENT OFFICE.

OMAN L. STUMP, OF MARION, OHIO, ASSIGNOR OF ONE-THIRD TO JOHN REIDENBAUGH AND ONE-THIRD TO EDWIN D. PACKARD, OF MARION, OHIO.

FILTER FOR FEED-WATER HEATERS.

No. 824,389.　　　Specification of Letters Patent.　　　Patented June 26, 1906.

Original application filed August 19, 1904, Serial No. 221,348. Divided and this application filed September 9, 1905. Serial No. 277,695.

*To all whom it may concern:*

Be it known that I, OMAN L. STUMP, a citizen of the United States, residing at Marion, in the county of Marion and State of Ohio, have invented certain new and useful Improvements in Filters for Feed-Water Heaters, of which the following is a specification, reference being had therein to the accompanying drawings.

This invention relates to filters for feed-water heaters, and has for its object to provide a filter for use in connection with any approved form of open feed-water heater, which filter shall be to a great extent practically self-cleaning while in use, thereby avoiding the necessity of frequent stoppages for the purpose of cleaning the filter; which may be readily and thoroughly cleaned without removing the same from the heater or vessel in which it is contained; which shall be of increased efficiency, not only by reason of its self-cleaning character, but also by reason of the large area of the filter-bed in proportion to the area of the filtering-chamber and by reason of the increased efficiency or thoroughness of the separation of the sediment from the feed-water; which will be strong and durable and readily assembled and taken apart when necessary.

To these and other ends my invention consists in certain novel features, which I will now proceed to describe and will then particularly point out in the claims.

In the accompanying drawings, Figure 1 is a central vertical sectional view, partly in elevation, of a structure embodying my invention in one form. Fig. 2 is a plan view of the same in section on the line *x x* of Fig. 1. Fig. 3 is a top plan view of the filter-bed. Fig. 4 is an enlarged detail sectional view of the same, taken on the line *y y* of Fig. 3 and looking in the direction of the arrows; and Fig. 5 is a similar section taken on the line *z z* of Fig. 3 and looking in the direction of the arrows.

In the accompanying drawings I have shown my improvements as applied to a well-known type of feed-water heater, known as the "open" type, the particular structure of this class chosen for purposes of illustration being the Cochrane heater set forth in United States Letters Patent No. 420,718 of February 4, 1890, and No. 530,749 of December 11, 1894. I wish it understood, however, that my invention is not limited to this particular heater, but is capable of a wide range of application. In heaters of this class the exhaust-steam is admitted to the vessel or chamber 1 through a pipe 2, and passing through the open upper portion of the heater escapes through the outlet-pipe 3. The feed-water is admitted to the heater through a pipe 4 and is brought into intimate contact with and thoroughly heated by the steam in the upper part of the heater, chemicals being introduced, if desired, along with the feed-water. The feed-water is drawn off through a pipe 5, preferably by means of a pump, and a filter is interposed between the feed-water outlet and the upper part of the heater to extract from the water the sediment deposited by the heating thereof and also that formed by the chemical treatment of the water. Heretofore, so far as I am aware, the filter-bed thus employed has been so constructed that it begins to clog with the sediment at once and in twenty-four hours has become so clogged that it becomes necessary to put the heater out of use, empty and open it, and remove, clean, and replace the filter-bed. This involves either delay by way of stoppage of the plant or the employment of a duplicate set of heaters, and in any event involves expense in labor and a constantly-diminishing efficiency of the filter-bed while in use. To overcome these objections, I have devised a filter-bed composed of cloth or other suitable fabric, muslin being preferred, suitably supported so as to maintain its position, which is inclined to the horizontal is such a way that the sediment deposited on top of the filtering fabric will descend along the surface of the same, its descent being facilitated by the agitation of the water in the filtering-chamber, due to the pulsations of the steam-exhaust and of the feed-pump which draws off the feed-water. Preferably this filter-bed extends diagonally across the filtering-chamber from the water-line downward to the bottom of said chamber, its diagonal position presenting a largely-increased area of filtering-surface over the ordinary bed, which is horizontally arranged. In its preferred form the filter-bed comprises a plurality of sheets of filtering fabric, preferably of increasing fineness downward and separated by spacing-gratings so constructed as to permit the free and unobstructed downward passage of the sediment along the top surface of each filtering-sheet. Provision is also made for supplying water in such way that the filtering-surfaces may be positively and effectually washed and cleaned without removing them from the heater or filtering-chamber in which they are placed.

Referring to the embodiment of my invention shown in the accompanying drawings, the lower portion of the heater 1, which may be termed the "filtering-chamber," is indicated by the reference-numeral 6, and to each of the side walls of said chamber there is secured an inclined support, preferably in the form of an angle-iron 7, extending diagonally downward from the neighborhood of the water-line to the neighborhood of the bottom of the chamber. At each end of these supports 7 there are located transverse supports 8 and 9, which being interposed between the filter-bed and that portion of the chamber containing the filtered water constitute partitions which prevent the unfiltered water from passing around the ends of the filter-bed, compelling it to pass through the said bed to reach the pure-water outlet. The lower support or partition 8 is located a short distance from the adjacent end wall of the chamber, thereby forming a sediment-chamber 10 at the bottom of the heater and at the foot of the inclined filter-bed. Blow-off or outlet pipes 11, provided with controlling-valves 12, communicate with this sediment-chamber, as shown.

The filter-bed in its preferred form is built up in the following manner: Upon the angle-bars 7 there rests a supporting-grating 13, which is preferably built of a plurality of sections small enough to permit their introduction through the usual door in the side of the heater. Upon this supporting-grate 13 there rests a sheet of filtering fabric 14, which being the lowermost sheet is preferably of finer texture than those above it. This sheet of filtering fabric is held in position by means of a grate 15 resting upon it and also preferably built up of a plurality of sections of a size such as to permit their ready introduction into the heater. Upon the grate 15 there rests a sheet of filtering fabric 16, preferably somewhat coarser than the fabric 14, and upon the sheet 16 there rests a grate 17, similar to the grate 15. The filter-bed may be built up of any desired number of sheets of fabric and grates; but in the present instance I have shown three of each, the grate 17, supporting a sheet of fabric 18, preferably coarser than the sheet 16 and held in position by a superposed grate 19. The main supporting-grate 13 may be of any suitable construction which will support the parts above it and permit the passage of the filtered water. The upper grates, however, which serve to hold in place and also space apart or separate the sheets of filtering fabric, are so constructed that while their longitudinal bars 20 extend from fabric to fabric their cross-bars 21 are of less depth, extending downward only a part of the distance between the sheets of fabric, thus leaving longitudinal channels 22, which extend unobstructedly along the top of each sheet of fabric from the upper to the lower edge thereof. Thus each sheet of filtering fabric has the major portion of its upper surface entirely free and unobstructed in the direction of its inclination from end to end thereof, and no obstructions are present which would tend to cause the sediment to lodge upon said sheets or to prevent its free descent along the same and its free discharge from the lower end of each sheet into the sediment-chamber.

The several gratings may be held in position in any suitable manner; but I prefer for that purpose the construction shown, in which each of the angle-irons 7 has extending upward therefrom studs or bolts 23, which pass through the several gratings to hold them in position. The gratings, when constructed in sections, are further held in position by means of bars 24, extending longitudinally of the bed over the top of the sections of the uppermost grate, these longitudinal bars being held in place by transverse bars 25, secured in position by the studs 23, the upper projecting ends of which are threaded and receive nuts 26, which hold the bars in position. By reason of this construction the filtering-bed may be readily taken apart and removed from the heater when necessary and as readily replaced.

The filter-bed thus constructed is to a great extent self-cleaning. The feed-water must pass through every one of the several sheets in order to reach the outlet and will deposit its sediment upon the upper surfaces of the several sheets, any sediment which may pass through the coarser sheets being arrested by the finer ones. The pulsations of the exhaust-steam in the upper chamber of the heater, or those of the feed-pump connected to the outlet-pipe 5, or both, cause a pulsation or agitation of the water within the heater which is imparted to the sheets of filtering fabric. The natural tendency of the sediment is to pass downward by gravity along the inclined unobstructed surfaces of the filtering-sheets, and this natural tendency is reinforced by the pulsations of the said sheets, which prevent the sediment from adhering to their surfaces and cause it to move steadily downward toward the sediment-chamber. In case, however, by an extended period of continuous use or from other causes the filtering-cloths become clogged to an extent which diminishes their efficiency, provision is made for cleaning them without removing them from the heater or in any way disturbing them. To this end there is located within the heater, at the top of the filtering-chamber and extending transversely across the same at the upper end of the filtering-bed, a wash-pipe 27, connected with a supply of water under pressure by a pipe 28, having a controlling-valve 29. Within the heater the pipe 27 is slotted or otherwise apertured, as indicated at 30, so as to discharge the wash-water upon the sheets of filtering material of which the bed is composed, such discharge taking place at the upper ends of said sheets. Preferably the upper end of the filter-bed is inclosed between the support or partition 9 at its lower edge and a partition 31 at its upper edge, so as to form a chamber 32 in which the pipe 27 is located and discharges and with which the upper ends of the spaces between the grates of which the bed is composed are in free communication. In this way a full supply of water to each of the sheets is assured. When it is desired to wash the filter-bed, the heater may be emptied and washed by water under pressure supplied from the pipe 27, which water will descend along the upper surfaces of the filtering-sheets and will thoroughly clean the same, washing the sediment down into the sediment-chamber 10, from which it can be readily removed through the pipes 11. Of course the sediment-chamber may be blown out in the usual manner through these pipes at any time. A thorough washing of the filter-bed is rendered possible by its inclined position, such washing not being practicable in the case of the usual horizontal filter-bed.

In practice I have found that the structure which I have devised is capable of continuous use for long periods without any interruption in the operation of the heater, its efficiency being high, owing to its self-clearing character and to the relatively large amount of water which is therefore permitted to pass through it. When its efficiency does become impaired by clogging, it can be readily and quickly cleaned without removal from the heater and at a small fraction of the expense and time ordinarily required.

I do not wish to be understood as limiting myself to the precise details of construction hereinbefore described and shown in the accompanying drawings, as it is obvious that these details may be modified without departing from the principles of my invention.

I make no claim in the present application to the broad idea of the combination, with a feed-water heater having a steam-space above and a filtering-chamber below, of a filtering-bed extending in an incline position across said filtering-chamber to make it self-cleaning, the water inlet and outlet being respectively on the upper and under sides of said filtering-bed, nor do I claim in this application the combination, with such a structure, of the wash-water conduit and sediment-chamber located at the upper and lower ends of said bed, as these matters are claimed in an application filed by me August 19, 1904, Serial No. 221,348, and allowed June 30, 1905, of which application the present application constitutes a division.

Having thus fully described my invention, what I claim as new, and desire to secure by Letters Patent, is—

1. In combination with a feed-water heater having a steam-space above and a filtering-chamber below, a filtering-bed extending across the filtering-chamber of the heater in an inclined position and composed of a plurality of separated sheets of filtering fabric of successively-increasing fineness toward the under side of the bed, through all of which sheets the water successively passes, substantially as described.

2. In combination with a feed-water heater having a steam-space above and a filtering-chamber below, an inclined filtering-bed for the filtering-chamber thereof, comprising a supporting-grate, a sheet of fabric resting thereon, and a superposed grate having unobstructed channels on its under side extending in the direction of inclination of the bed, substantially as described.

3. In combination with a feed-water heater having a steam-space above and a filtering-chamber below, an inclined filtering-bed for the filtering-chamber thereof, comprising a supporting-grate, and alternate sheets of filtering fabric and spacing and retaining grates superposed thereon and on each other, said spacing-grates having unobstructed channels on their under sides extending in the direction of inclination of the bed, substantially as described.

4. A feed-water heater having a steam-space above and a filtering-chamber below, and a sediment-chamber provided with a sediment-outlet at the bottom thereof, a wash-water chamber at the top of said filtering-chamber, and a filtering-bed extending in an inclined position across the filtering-chamber from the water-line to the sediment-chamber, said filtering-bed being composed of alternately-superposed grates and sheets of filtering fabric, the grates being provided on their under sides, above the fabric, with unobstructed channels extending continuously in the direction of inclination of the bed, substantially as described.

5. In combination with a feed-water heater having a steam-space above and a filtering-chamber below, having partitions at the water-line and bottom, and wash-water and sediment chambers adjacent thereto respectively, angle-bars extending between said partitions, and a filtering-bed supported on said partitions and angle-bars and composed of alternately-superposed sheets of filtering material and grates, the grates being provided on their under sides, above the sheets, with unobstructed channels extending in the direction of inclination of the bed, substantially as described.

6. In combination with a feed-water heater having a steam-space above and a filtering-chamber below, said filtering-chamber having fixed supports therein, a removable filter-bed composed of alternate grates and sheets of filtering fabric, each grate composed of a plurality of relatively small sections, tie-bars extending over the uppermost grate, and threaded studs extending through the grates and provided with nuts to secure the tie-bars, substantially as described.

In testimony whereof I affix my signature in presence of two witnesses.

OMAN L. STUMP.

Witnesses:
CARL T. BAUMAN,
ROBERT G. LUCAS.